United States Patent
Bolohan

(10) Patent No.: US 9,015,117 B2
(45) Date of Patent: Apr. 21, 2015

(54) SYSTEM AND METHOD FOR SYNCHRONIZATION OF ACTIONS IN THE BACKGROUND OF AN APPLICATION

(71) Applicant: Google Inc., Mountain View, CA (US)

(72) Inventor: Matthew Bolohan, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/020,166

(22) Filed: Sep. 6, 2013

(65) Prior Publication Data

US 2014/0074778 A1    Mar. 13, 2014

Related U.S. Application Data

(63) Continuation of application No. 13/463,131, filed on May 3, 2012, now Pat. No. 8,554,729.

(60) Provisional application No. 61/529,646, filed on Aug. 31, 2011.

(51) Int. Cl.
*G06F 17/30* (2006.01)
*H04L 29/08* (2006.01)

(52) U.S. Cl.
CPC ...... *G06F 17/30575* (2013.01); *H04L 29/0854* (2013.01); *H04L 67/1095* (2013.01); *G06F 17/30377* (2013.01); *G06F 17/30902* (2013.01)

(58) Field of Classification Search
CPC .................. G09F 17/30377; H04L 67/1095; H04L 29/0854
USPC .......................................................... 707/617
See application file for complete search history.

(56) References Cited

U.S. PATENT DOCUMENTS

| | | | |
|---|---|---|---|
| 6,034,621 A | 3/2000 | Kaufman | |
| 6,035,332 A * | 3/2000 | Ingrassia et al. | 709/224 |
| 7,487,455 B2 | 2/2009 | Szeto | |
| 7,831,673 B1 | 11/2010 | Cohen et al. | |
| 2003/0217152 A1* | 11/2003 | Kasper, II | 709/226 |
| 2005/0210081 A1* | 9/2005 | Fleck et al. | 707/204 |
| 2007/0060123 A1* | 3/2007 | Maes | 455/432.1 |
| 2009/0094332 A1 | 4/2009 | Schemers, III et al. | |
| 2009/0132556 A1* | 5/2009 | Gupta et al. | 707/100 |
| 2009/0248695 A1 | 10/2009 | Ozzie et al. | |
| 2009/0259744 A1 | 10/2009 | Kolke et al. | |
| 2010/0257230 A1 | 10/2010 | Kroeger et al. | |
| 2012/0151368 A1* | 6/2012 | Tam | 715/738 |

OTHER PUBLICATIONS

Google Inc., International Search Report and Written Opinion, PCT/US2012/051335, Nov. 5, 2012, 10 pgs.
Neuberg, Creating Offline Web Applications with Dojo Offline, Mar. 6, 2010, 16 pgs.

(Continued)

*Primary Examiner* — Jensen Hu
(74) *Attorney, Agent, or Firm* — Morgan, Lewis & Bockius LLP

(57) ABSTRACT

A background page script is executing on a device. A plurality of webpages are executing on the device. The plurality of webpages register with the background page script. An action generated by one of the plurality of webpages is cached in a database. In response to a determination that the device is in an online state and that the one of the plurality of webpages is no longer registered, the background page script retrieves the action from the database and transmits the action.

20 Claims, 9 Drawing Sheets

(56) References Cited

OTHER PUBLICATIONS

Online and offline events, Mozilla Developer Network, Jun. 17, 2011, 5 pgs.

"Online and offline events," Mozilla Developer Network, Jun. 17, 2011. Retrieved from the Internet: <URL: https://developer.mozilla.org/en/Online_and_offline_events> (5 pages).

Neuberg, Brad "Creating Offline Web Applications with Dojo Offline", retrieved from the Internet: URL:http://docs.google.com/View?docid=dhkhksk4_8gdp9gr on Mar. 6, 2010 (16 pages).

PCT International Search Report corresponding to PCT Application PCT/US2012/051335 mailed Nov. 5, 2012 (3 pages).

PCT Written Opinion of the International Searching Authority corresponding to PCT Application PCT/US2012/051335 mailed Nov. 5, 2012 (7 pages).

* cited by examiner

SYSTEM AND METHOD FOR SYNCHRONIZATION OF ACTIONS IN THE BACKGROUND OF AN APPLICATION

CROSS REFERENCE TO RELATED APPLICATIONS

This application is a continuation application of U.S. patent application Ser. No. 13/463,131, filed on May 3, 2012 which claims benefit, pursuant to 35 U.S.C. §119(e), of U.S. Provisional Application Ser. No. 61/529,646 filed Aug. 31, 2011, both of which are hereby incorporated herein by reference in their entirety.

TECHNICAL FIELD

This specification relates generally to systems, methods and apparatus for synchronizations of actions in the background of an application and more particularly to systems, methods and apparatus for synchronizations of actions in the background of a web application when returning to an online state.

BACKGROUND

Existing systems provide limited to no functionality to users accessing web applications while in an area with limited or spotty Internet access. For example, in existing electronic mail (email) applications, when a device accessing the email application has spotty or no Internet access, little to no functionality is available until the device regains access to the Internet.

Some devices accessing email applications while not connected to the Internet may provide a static display of email messages cached in an inbox. For example, a user using the device may see subjects of emails or cached portions of emails that were previously sent before the device was disconnected from the Internet. However, the display of subjects of email messages are static and little functionality is provided to the user until the user reconnects to the Internet. Further, existing systems have limited capability in terms of synchronizing data between the device and the email server.

SUMMARY

In accordance with an embodiment, multiple webpages executing on a device are registered with a background page script executing on the device. An action generated by one of the multiple webpages in a database is cached. In response to a determination that the device is in an online state and that the one of the multiple webpages is no longer registered: the action is retrieved, by the background page script, from the database, and the action is transmitted by the background page script.

In an embodiment, the action is transmitted by the background page script to a host server.

In an embodiment, in response to receipt of an acknowledgment of successful transmission of the action, the action is removed from the database.

In an embodiment, a second action is cached in the database by one of the multiple webpages. The one of the multiple webpages transmits the second action. The one of the multiple webpages removes the second action from the database.

In an embodiment, a request to no longer be registered is transmitted by the one of the multiple webpages to the background page script.

In an embodiment, removing the second action from the database occurs in response to receipt of a second acknowledgment of successful transmission of the second action. In an embodiment, transmitting the request to no longer be registered in response to receiving a request by a user to close the one of the multiple webpages.

In an embodiment, the action in the database is locked.

In an embodiment, each of the multiple webpages is associated with at least one of: an email application, a web document processing application, a multimedia player application, a social media network application, a spreadsheet application, a presentation application, a game application, an image editing application, and a video editing application.

In accordance with an embodiment, an application is accessed by a device via an Internet. A background page script associated with the application is executed by the device. A first webpage associated with the application and a second webpage associated with the application are registered in a background page. A first action generated by the first webpage and a second action generated by the second webpage are stored in a database while the device is in an offline state. It is determined that the first webpage and the second webpage are closed. The first webpage and the second webpage deregister from the background page. The first action and the second action are retrieved from the database by the background page script. The first action and the second action are transmitted to a server via the Internet.

These and other advantages of the present disclosure will be apparent to those of ordinary skill in the art by reference to the following Detailed Description and the accompanying drawings.

DETAILED DESCRIPTION

Figure 1:
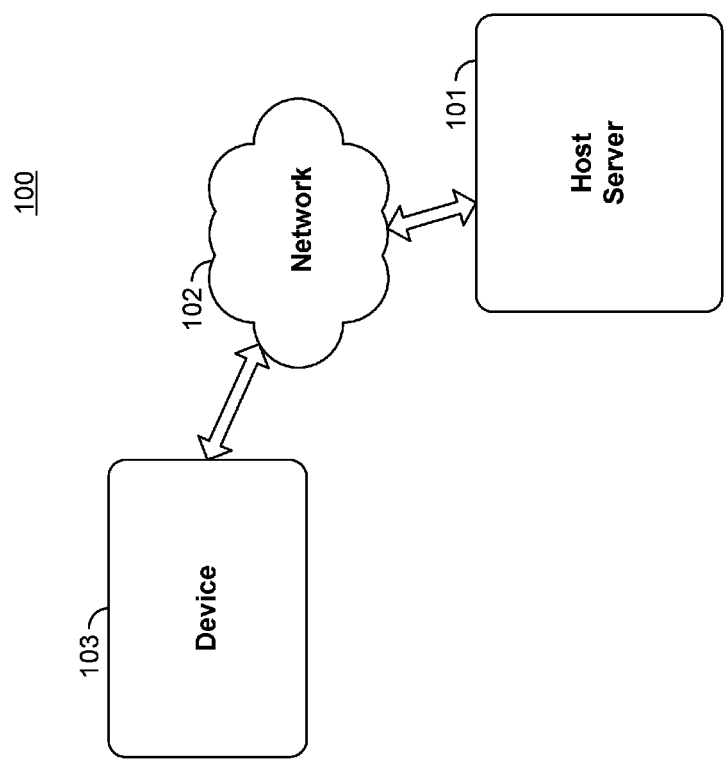
FIG. 1 shows a communication system 100 that may be used to perform synchronizations of actions in the background of an application, in accordance with an embodiment.

FIG. 1 shows a communication system 100 that may be used to perform synchronizations of actions in the background of an application, in accordance with an embodiment. Communication system 100 includes a network 102, a host server 101 and a device 103. Communication system 100 may include more than one device. In an embodiment, communication system 100 may include more than one host server or other servers.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 102 may include a combination of different types of networks.

Figure 3:
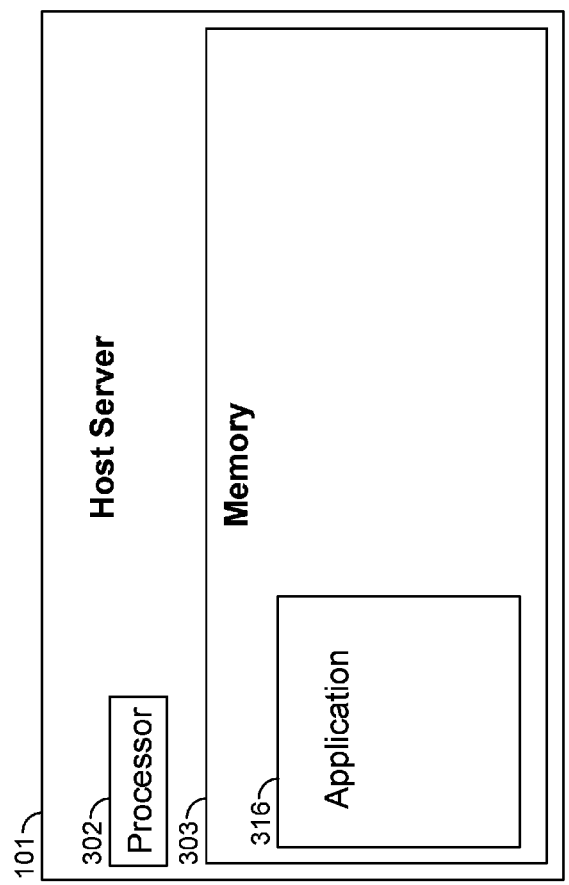
FIG. 3 shows functional components of a host server, in accordance with an embodiment.
Figure 6:
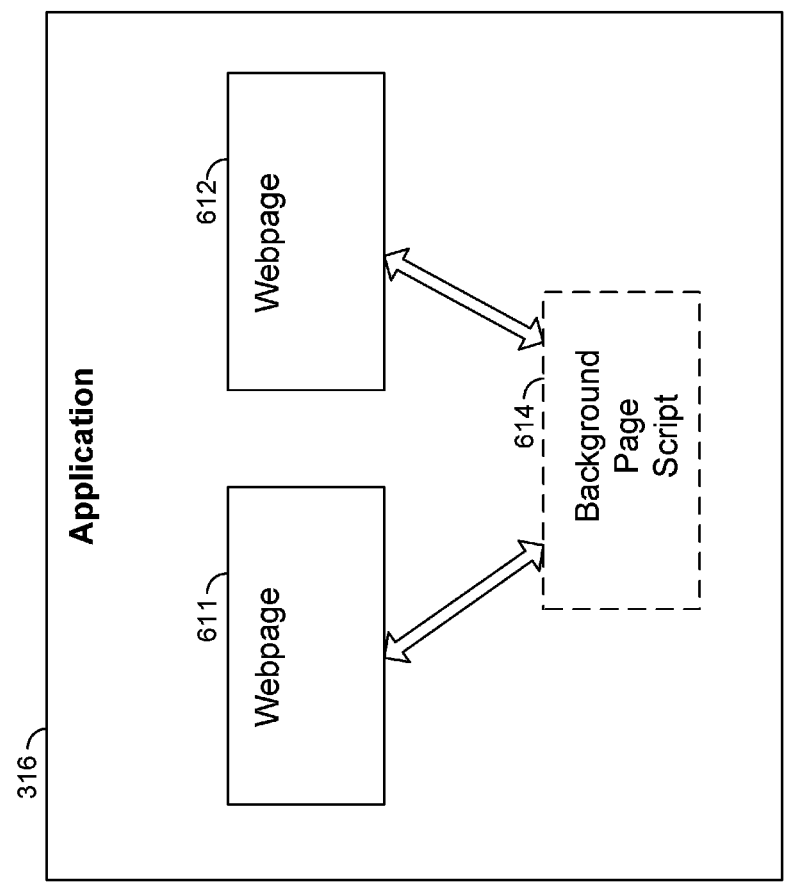
FIG. 6 shows a display of an application executing on a browser in accordance with an embodiment.

Communication system 100 also includes host server 101. In an embodiment, host server 101 may host a web application that can be accessed by device 103. In an alternate embodiment, the web application may be hosted by any other server. In an embodiment, host server 101 may provide access to one or more webpages providing access to the web application. For example, as depicted by FIGS. 3 and 6, host server 101 may host an application 316, which displays webpages 611 and 612. Webpages 611 and 612 may alternatively be referred to as foreground pages. Device 103 may access a World Wide Web page such as webpages 611 and 612 that may be viewed using a conventional web browser, for example.

Device 103 may be any device that enables a user to access application 316. Device 103 may be connected to network 102 through a direct (wired) link, or wirelessly. Device 103 may have a display screen (not shown) for displaying information. For example, device 103 may be a personal computer, a laptop computer, a workstation, a mainframe computer, a mobile communication device such as a wireless phone, a personal digital assistant, cellular device, a laptop computer, a netbook, a tablet device, an electronic book reader etc. Other devices may be used.

Figure 2:
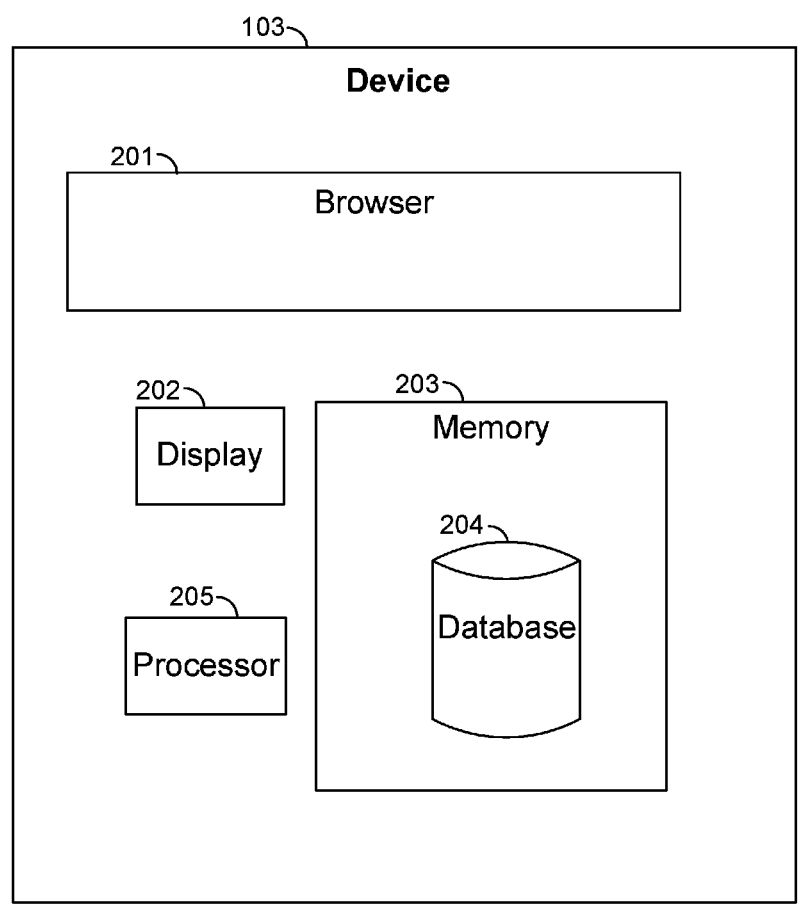
FIG. 2 shows functional components of a device, in accordance with an embodiment.

FIG. 2 shows functional components of device 103, in accordance with an embodiment. Device 103 includes a browser 201 and a display 202. Browser 201 may be a conventional web browser used to access World Wide Web sites via the Internet, for example. Display 202 may display software applications, webpages, documents, text, images, video, multimedia and other information.

Device 103 also includes a memory 203 which includes a database 204. Database 204 may be used to store or cache items locally on device 103. In an embodiment, database 204 may be a Structured Query Language (SQL) or SQLite database. Device 103 includes a processor 205.

FIG. 3 shows functional components of host server 101, in accordance with an embodiment. Host server 101 includes a processor 302 and a memory 303. Host server 101 may include other components not shown in FIG. 3. Memory 303 stores application 316. In an alternative embodiment, application 316 may be stored external to memory 303 and host server 101.

Supposing that a user employs device 103 to access application 316, the user may be provided with a display of the application. Suppose now that the application is a web application, such as a web email application, a web document processing application, a multimedia player application, a social media network application, a spreadsheet application, a presentation application, a game application, an image editing application, a video editing application, or any other application that communicates actions from a device to a server. Should the user wish to access the web application, the user may click on an icon for the application on display on device 103, type in a Uniform Resource Locator (URL) associated with the web application or otherwise access the application. The application opens up and may be viewable via a webpage (e.g. webpage 611 in FIG. 6). In an embodiment, the webpage may provide a display of the web application.

Figure 4:
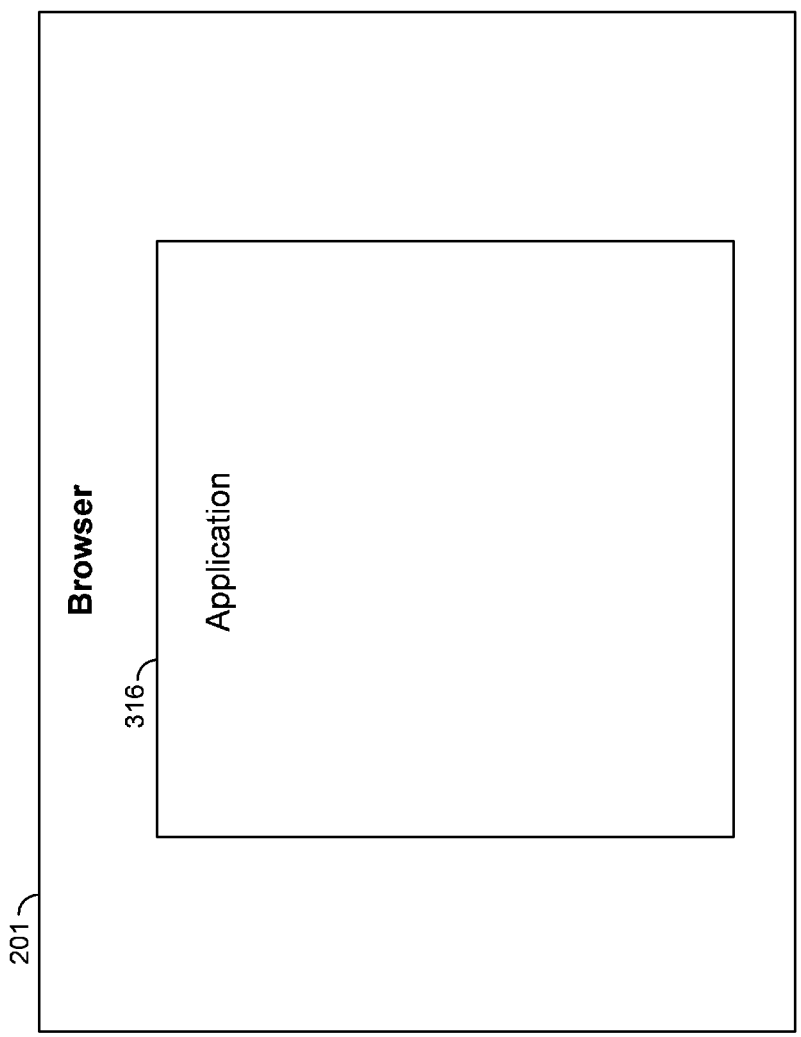
FIG. 4 shows a display of an application executing on a browser, in accordance with an embodiment.

In another embodiment, the application may be executing on device 103, as well as on host server 101, and when the user accesses a webpage, the user may use the application, as depicted in FIG. 4. FIG. 4 shows a display of an application executing on a browser, in accordance with an embodiment. For example, device 103 comprises browser 201 which executes application 316. In this example, application 316 may be the same application that is executing on host server 101. Alternatively, application 316 may be different than the application executing on host server 101. In an embodiment, application 316 may be executing on browser 201. In this embodiment, host server 101 may remotely store data associated with application 316, executing only on device 103.

Figure 5:
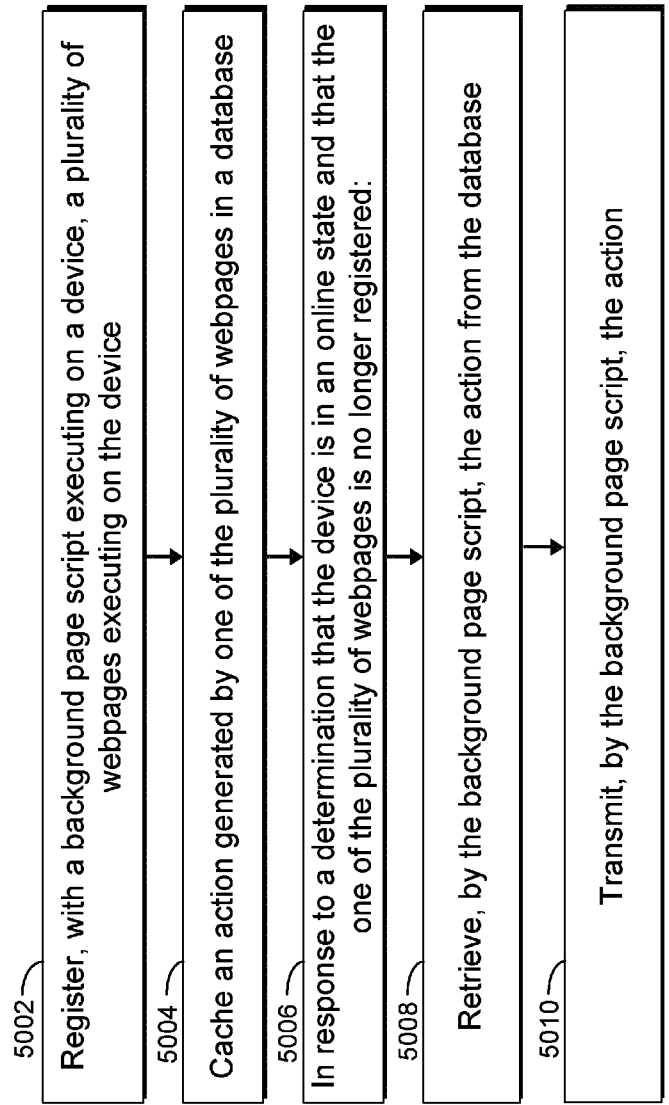
FIG. 5 is a flowchart depicting a method of using a background page script, in accordance with an embodiment.

FIG. 5 is a flowchart depicting a method of using a background page script, in accordance with an embodiment. At step 5002 a plurality of webpages executing on a device register with a background page script executing on the device. As depicted by FIG. 6, background page script 614, executing on device 103 in FIG. 1, registers a plurality of webpages (e.g. webpage 611 and webpage 612) executed on device 103. Communication between background page script 614 and a plurality of webpages (e.g. webpage 611 and webpage 612) is depicted by the arrows shown in FIG. 6. In an embodiment, various methods of communication include direct function call, post message, web intents, publish/notify mechanisms using shared storage, etc.

Figure 7:
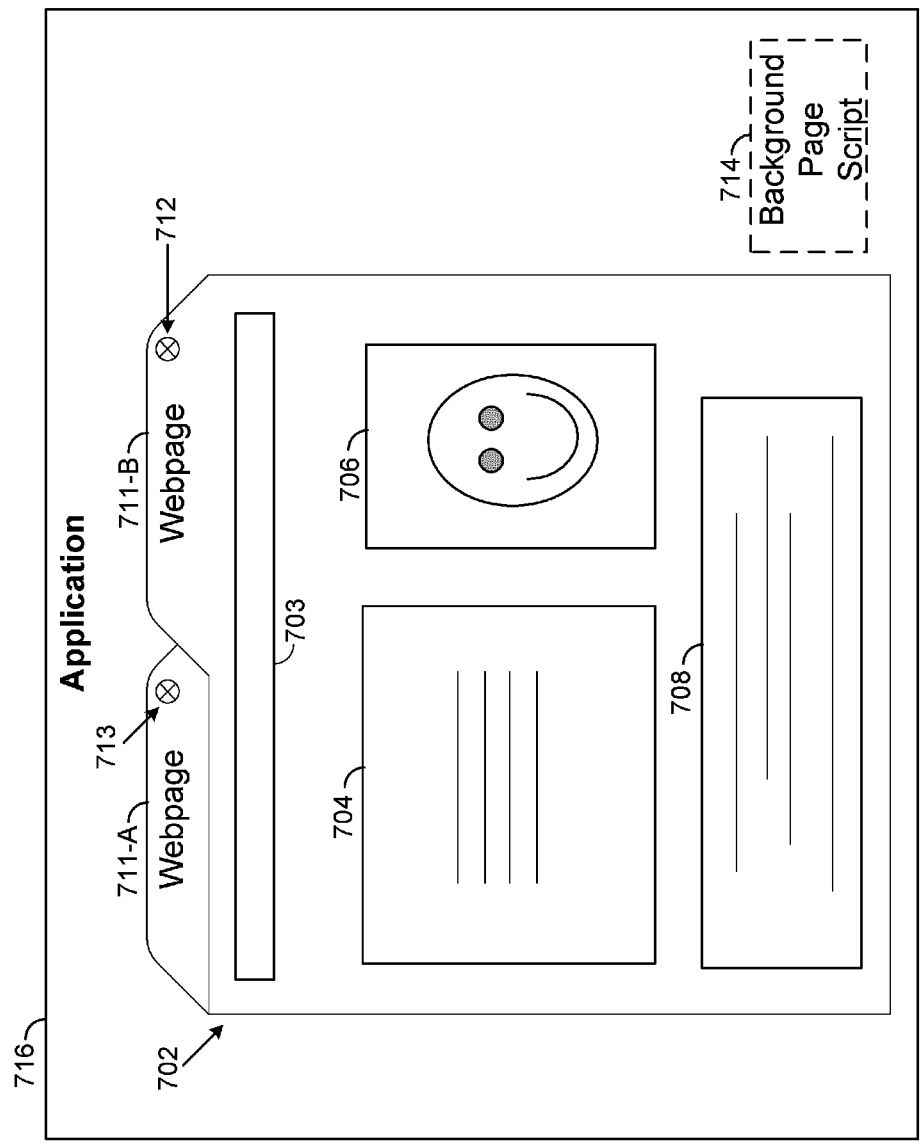
FIG. 7 shows a display of an application including tabbed webpages in accordance with an embodiment.

In an embodiment depicted by FIGS. 6 and 7, suppose that a user employing device 103 is using application 316. Application 316 may be a web email application. When application 316 is executed by the user, a background page script 614, depicted by FIG. 6, is also executed. In an embodiment, only one background page script may be used for one application and if multiple instances of the application are running, only a single background page script may be needed. Background page script 614 also manages a webpage register and registers therein each webpage of application 316 that is opened. Background page script 614 may be invisible to the user. Background page script 614 may maintain a counter of active pages and keep track the active pages. Application 316 may communicate with background page script 614 to inform background page script 614 when a webpage opens (so it may be registered with background page script 614) and when a webpage closes (so it may be deregistered with background page script 614). In this way, when a webpage closes, the counter is decremented. In an embodiment, background page script 614 waits until the counter decreases to zero (e.g. when zero webpages are open) before transmission of actions, as described below.

The user may open up a plurality of webpages (e.g. webpage 611 and webpage 612) associated with application 316. For example, if the user is reading email, webpage 611 may provide a display of email messages to the user. The user may open a new webpage 612 which may provide a display of a new email message the user is composing. Therefore, the user may utilize each window to perform a separate task, for example, one window to perform a task of reading an email and another window to perform a task of writing an email. In an embodiment, the user may utilize one or more windows to perform the same task, or one or more windows may be used to perform multiple tasks.

In an embodiment, application 316 may be a web application which is executing on host server 101. Therefore, in FIGS. 6 and 7, a display of an application or webpages that graphically depict the executed application to a user employing device 103 is shown.

Multiple Tasks

In an embodiment depicted by FIG. 7, an application 716 comprises tabbed webpages 702. In an embodiment, application 716 may be a web email application. Tabbed webpages 702 comprises webpage 711-A and webpage 711-B. In the embodiment depicted by FIG. 7, webpage 711-B is selected (e.g. by clicking on or selection of an area of webpage 711-B, by use of a mouse, a keypad, other input devices, by touch using a touch-screen enabled device, by using a voice command, etc.) and therefore, the contents of webpage 711-B are displayed. Webpages 711-B includes an area 703 which may comprise an address bar or other information, an area 704 which may comprise a display of an inbox, area 708 which may comprise a chat log and an area 706 which may comprise an image, video or other multimedia. Webpage 711-A may comprise similar items as webpage 711-B, or each window may be an exact replica of another. In an embodiment similar to the one described above with respect to FIG. 6, a user may employ webpage 711-A to write email messages and perform one set of tasks while employing webpage 711-B to employ one or more of the same, or different, tasks as in webpage 711-A. In an embodiment, some or all tasks presented in webpage 711-A may be different than the ones presented in webpage 711-B.

In an embodiment, webpage 711-A may be used by one user to sign into an email account while webpage 711-B may be used by the same or another user to sign into another email account.

Suppose now that a user is traveling in the passenger seat of a car. The user is using a netbook and wishes to use application 716 to view and perform tasks associated with an email account. When the user opens up, enters or otherwise accesses webpage 711-B in application 716, webpage 711-B registers with a background page script 714. In an embodiment, background page script 714 runs in the background of application 716 and may be invisible to the user. Similarly, when the user opens up another tabbed webpage 711-A or any other webpage within application 716, webpage 711-A registers with background page script 714. Similarly, in the embodiment depicted by FIG. 6, should webpage 611 or webpage 612 be opened up by the user, each of webpage 611 and webpage 612 registers with background page script 614, which runs in the background of application 316.

At step 5004, an action generated by one of the plurality of webpages is cached in a database. An action generated by one of the plurality of webpages (webpage 611 and webpage 612 in FIG. 6, or webpage 711-A and webpage 711-B in FIG. 7) is cached in database 204. In an embodiment, the action may be a command and/or mutation such as save, delete, flag as important, select as spam, move to another folder, send, forward, download, star, share, edit, add attachment/image/link/media, etc.

After signing in, logging in or otherwise accessing the email account, the user may be presented with a display depicting a plurality of tasks. The user may, for example, view an email inbox in area 704; a chat log in area 708 and an image, video, etc. in area 706. When the car travels in an underground tunnel, the user may temporarily lose Internet access (e.g. due to poor reception signal) and go into an offline state. Instead of being disconnected from application 716, the user is allowed to continue clicking on emails in the inbox and typing chat messages to his friends in the chat log. The user would be able to view, access or draft emails within application 716, even if the Internet connection was spotty or lost while the car travels in the underground tunnel. In an embodiment, a local copy is made of items associated with an email account and displayed to the user on webpage 711-B. That is, email messages, chat messages, etc. associated with the email address are stored locally within memory 203 of device 103. The messages, etc., associated with the email address may be stored within database 204 or within another storage element (not shown in FIG. 2).

In another embodiment, suppose now that a user device is in an offline state for an extended period of time. For example, suppose that a user is using his/her mobile phone, laptop, netbook, etc. on a plane that does not offer wireless Internet access. The user may type an email message to an email contact stored in an address book. The user is capable of typing the email in the email program, even when the device is in an offline state for an extended period of time. The email is stored locally within database 204 (or another storage element not shown in FIG. 2).

All actions or commands issued by the user are cached in database 204. For example (in FIG. 7), suppose that the user wishes to delete an email message displayed in the inbox in area 704, type a chat message to a friend within chat log displayed in area 708 and forward a video displayed in area 706 to another friend. When the user issues these actions, each action is cached in database 204 so that they may be saved until a successful transmission of the actions is made to host server 101.

Suppose now that the user has finished accessing the email account. The user will then close out of webpage 711-B by clicking on an "x" 712. Similarly, the user can close out of webpage 711-A by clicking on an "x" 713. In an embodiment, the user may close out of the webpages by issuing a keyboard command, a voice command, by clicking in on an alternate element triggering the closing of the webpages, by touching an area of the webpages causing them to close out (in case the user is employing a touch-screen capable device) or by other means.

In an embodiment, the user may close out of application 716 or perform another task which may trigger the closing of the webpages. As soon as the webpages are closed, they are deregistered by background page script 714. The actions remain cached in database 204 until Internet connection is reestablished.

When device 103 is able to reconnect to host server 101, via network 102, the actions cached in database 204 are transmitted to host server 101. In an embodiment, background page script 714 may cause device 103 to periodically ping host server 101 to determine whether a connection can be made and device 103 is in an online state. In another embodiment, other means may be used to determine when device 103 regains access to the Internet and may then establish a connection with host server 101.

At steps 5006 and 5008, in response to a determination that the device is in an online state and that one of the plurality of webpages is no longer registered: the action is retrieved from the database by the background page script. In response to a determination that device 103 is in an online state and that webpage 711-B is no longer registered, the action is retrieved from database 204 by background page script 714.

Therefore, background page script 714 retrieves the actions from database 204. At step 5010, the action is transmitted by the background page script. The action is transmitted by background page script 714 to host server 101, via network 102. In an embodiment, background page script 714 may wait for a predetermined amount of time before retrieving the actions and attempting to transmit them to host server 101. For example, background page script 714 may wait a few milliseconds, a minute or no time at all to see if device 103 goes back into an online state.

Actions may be associated with webpages and may be separated based on webpages. Actions may also be separated based on users. For example, a first user may perform actions to a webpage which may be separated from actions performed by a second user.

When attempting to transmit actions when webpage 711-B is closed, webpage 711-B is identified and only actions belonging to webpage 711-B are transmitted. In an embodiment, if multiple webpages are open, all of the multiple webpages are closed prior to transmitting the actions. When all the multiple webpages are closed, all actions may be transmitted without knowledge of associations of actions with respective webpages. That is, all actions may be sent, without knowledge of which action is associated with which webpage.

In an embodiment, returning of device 103 to an online state may be referred to as an online event. Specifically, when device 103 switches from an offline state to an online state, the online event occurs. During the online event, device 103 may resynchronize with host server 101. When device 103 switches from an online state to an offline state, an offline event occurs.

Batching of Actions

Background page script 714 may transmit the actions or commands stored in database 204 to host server 101. In an embodiment, background page script 714 may batch together a plurality of actions prior to transmitting to host server 101. In another embodiment, background page script 714 may only batch related actions together prior to transmission. For example, all actions associated with email may be batched together, all actions associated with the chat log may be batched together, etc. In another embodiment, all actions may be bundled and transmitted at once. In another embodiment, the size of the payload may be predetermined and as many actions that can be transferred within the predetermined size are transmitted.

In an embodiment, the transmission of actions may be performed in an order of how actions were placed in a queue (e.g. in a first in, first out fashion). In other embodiments, the queuing may be performed in a first in, last out; last in, last out; last in, first out or any other fashion.

When host server 101 receives the actions, host server 101 applies the desired actions. For example, should an action received by host server 101 indicate deletion of a message, host server 101 deletes the message. When a user accesses the email again, the message is deleted and no longer shown in the email inbox.

In an embodiment, all webpages associated with the application must be closed and/or deregistered with the background page script before the background page script initiates transmission of actions. For example, the background page script may not synchronize actions with the host server while some application webpages are open because the risk of having duplicate actions increases. Therefore, in order to avoid deduping by the host server, which may provide an additional burden on host server, the background page script waits until all webpages are closed. Deduping may be complex to perform on the host server as duplicate actions could be sent hours and/or days apart due to offline behavior.

Deduping may be possible if every action is assigned a unique identification. Therefore, the unique identification may be used to ensure that duplicate actions are eliminated and synchronization is performed properly. For example, every time an action is performed on a webpage, a unique identification is assigned to that action. When a next action occurs, a next unique identification must be obtained, where the next unique identification is not the same as another unique identification. Thus, all webpages must communicate with a same assignment agency or source (e.g. host server 101) to obtain the unique identification. The host server would then receive the actions with the unique identification. The unique identification assignment agency must maintain and assign the identifications in a first in, first out implementation. In an embodiment where only one device is in communication with host server 101 and the device is the only device given permission to perform actions, the unique identification may alternatively be provided by a database contained within or in communication with the device.

In an embodiment, actions are queued together based on webpages. For example, webpage 711-A may have a plurality of actions that need to be applied, and webpage 711-B may have another plurality of actions that need to be applied. The plurality of respective actions for webpage 711-A, and the plurality of respective actions for webpage 711-B may be stored separately from one another. After successful transmission of the actions stored in the queue, a local copy of the actions may be removed from the queue. In an embodiment, the action is removed from the database, by the background page script, in response to receipt of an acknowledgment of successful transmission of the action. For example, when the actions are successfully transmitted to host server 101 (i.e. while device 103 is in an online state), host server 101 may send a receipt of acknowledgement. The actions may then be removed from database 204. Thus, the actions are synchronized between device 103 (and any other devices) and host server 101.

In an embodiment, after one or more webpages are closed, the background page script transmits to server 101 the actions stored in database 204 that are associated with the closed page(s). If during this transmission, a user employing device 103 issues a command to reopen webpage 711-B or open another webpage associated with application 716, background page script 714 may inform the user that it is busy. In an embodiment, background page script 714 may ignore the request for opening another webpage or reopening a webpage and/or delay the loading of a webpage until the transmission of actions to host server 101 is complete. In an embodiment, background pages script 714 may lock the application and webpages until the transmission is complete. For example a user may be provided with a text message box that states, "Please wait a moment while your actions are being transmitted." Alternatively, an icon such as an hourglass may be displayed to the user during the transmission. In an embodiment, a two-way handshake between background page script 714 and a foreground page may request permission to load queued actions from the background. The foreground page may send a message to request permission. During this period, a spinner or hour glass may be displayed (if necessary) while awaiting a response. After receiving permission, background page script 714 may send a message when it is safe to load actions.

In an embodiment, if transmission of actions is unsuccessful (e.g. an interruption in the reception signal occurs), background page script 714 prepends and retransmits the failed actions to host server 101.

When the actions have been transmitted to host server 101, and device 103 remains in an online state, background page script 714 then ceases control of transmission of actions. That is, when device 103 returns back online, webpages may maintain their own internal queue of actions and transmit actions directly to host server 101, without interference from background page script 714. In an embodiment, one of the plurality of webpages (e.g. webpage 711-B) caches a second action in database 204, transmits the second action (to host server 101) and removes, by the one of the plurality of webpages, the second action from database 214. In an embodiment, when device 103 is in an online state, webpages may maintain their own internal queues of actions as well as add the actions to a universal queue (accessible by background page script 714)

that holds all the actions taken place in all the webpages. In an embodiment, background page script 714 increments a counter upon registering of a webpage.

In an embodiment, removing the second action from database 204 occurs in response to receipt of a second acknowledgment of successful transmission of the second action. The receipt is transmitted by host server 101.

In an embodiment, the one of the plurality of webpages transmits to the background page script, a request to no longer be registered. For example, a user may close webpage 711-A and thus, webpage 711-A transmits to background page script 714 a request to no longer be registered (or deregister). Thus, transmitting the request to no longer be registered is in response to receiving a request by the user to close the one of the plurality of webpages.

When in an online state, after transmission of the queue of actions, the actions may be removed from the individual webpage queues as well as from the universal queue. Should device 103 go offline before complete transmission of the queue of actions, however, background page script 714 takes control, as described above.

In an embodiment, each of the plurality of webpages is associated with at least one of: an email application; a web document processing application; a multimedia player application; a social media network application; a spreadsheet application; a presentation application; a game application, an image editing application; and a video editing application.

In an embodiment, background page script 714 is regularly reloaded or updated so that a latest version of the background page script is maintained at device 103. When an update occurs in background page script 714, all webpages (e.g. webpages 711-A and 711-B, etc.) must then reregister with background page script 714. Background page script 714 may write a timestamp for the last time background page script 714 loaded. The webpages (e.g. foreground pages) may then all view the timestamp to determine that a reregister is required. Foreground pages may monitor the timestamp in a shared storage and reregister if the value of the timestamp changes. For example, using HTML (Hyper Text Markup Language) 5 LocalStorage, background page script 714 may perform a window.localStorage.backgroundLoaded=now( ); on every load. The foreground pages may listen to LocalStorage change events on property 'backgroundLoaded' and reregister whenever the value changes.

In an embodiment, the actions may be locked by database 204 to prevent duplicate sending of the same action.

In an embodiment, the background page script may manage synchronization of all actions, regardless of whether or not a device is in an online or offline state. Therefore, the background page script would manage all transmission of actions. In this embodiment, the background page script must be always be running.

Figure 8:
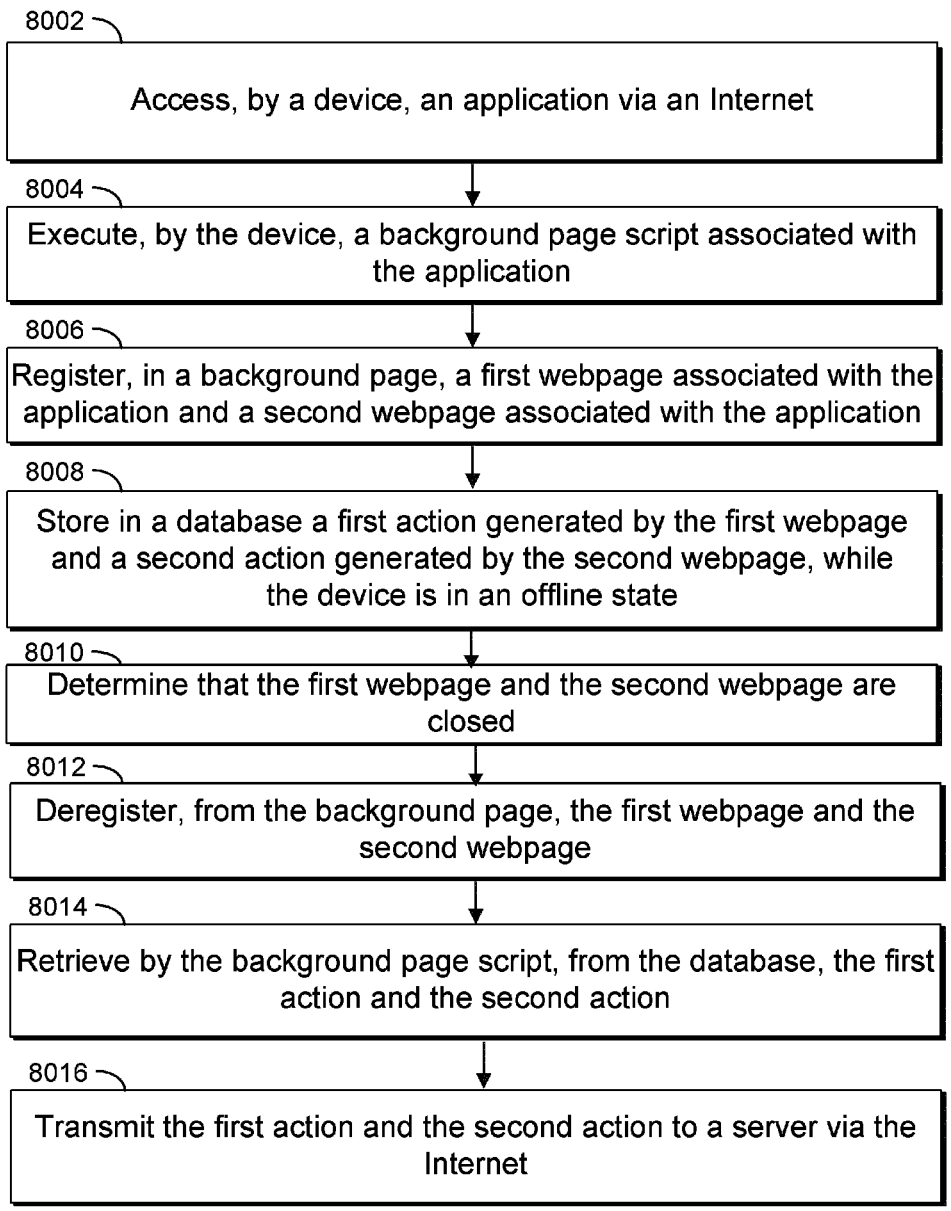
FIG. 8 is a flowchart of a method for the synchronization of actions, in accordance with an embodiment.

FIG. 8 is a flowchart of a method for the synchronization of actions, in accordance with an embodiment. As depicted by FIG. 8, multiple actions are generated in webpages. Therefore, when a device displaying the webpages goes back in an online state, multiple actions must be synchronized with a host server.

At step 8002, an application is accessed by a device via an Internet. For example, application 316 is accessed by device 103 via an Internet (i.e. network 102).

At step 8004, a background page script associated with the application is executed by the device. Background page script 614 associated with application 316 is executed by device 103. Background page script 614 may be running in the background of application 316, as depicted by FIG. 6.

At step 8006, in a background page, a first webpage associated with the application and a second webpage associated with the application are registered. First webpage 611 associated with application 316 and second webpage 612 associated with application 316 are registered in background page script 614.

At step 8008, a first action generated by the first webpage and a second action generated by the second webpage are stored in a database, while the device is in an offline state. A first action generated by first webpage 611 and a second action generated by second webpage 612 are stored in database 204, while device 103 is in an offline state. For example, a user employing device 103 may wish to flag important emails (e.g. a first action) in webpage 611 and delete junk emails (e.g. a second action) in webpage 612, while device 103 is in an offline state. Corresponding commands, or actions, are stored in database 204.

At step 8010, it is determined that the first webpage and the second webpage are closed. A determination is made (e.g. by background page script 614) that first webpage 611 and second webpage 612 are closed. For example, the user may close out of the webpages when finished with the email application.

At step 8012, the first webpage and the second webpage are deregistered from the background page. The background page script 614 may deregister first webpage 611 and second webpage 612 after they are closed, in a manner described above. Therefore, a counter in background page script 614 decrements and determines that all webpages associated with application 316 are closed.

At step 8014, the first action and the second action are retrieved by the background page script, from the database. The first action and the second action are retrieved by background page script 614, from database 204. The first action and the second action may be queued in a first in, first out fashion. Furthermore, the first action and the second action may each include batched actions for each respective webpage. A determination may be made by device 103 that device 103 has returned to an online state.

At step 8016, the first action and the second action are transmitted to a server via an Internet. The first action and the second action are transmitted to host server 101 via the Internet (i.e. network 102). Background page script 614 may transmit the first action and the second action retrieved from database 204 to host server 101.

In various embodiments, the method steps described herein, including the method steps described in FIGS. 5 and 8, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5 and 8. Certain steps of the methods described herein, including one or more of the steps of FIGS. 5 and 8, may be performed by a server or by another processor in a network-based cloud-computing system. Certain steps of the methods described herein, including one or more of the steps of FIGS. 5 and 8, may be performed by a client computer in a network-based cloud computing system. The steps of the methods described herein, including one or more of the steps of FIGS. 5 and 8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5 and 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
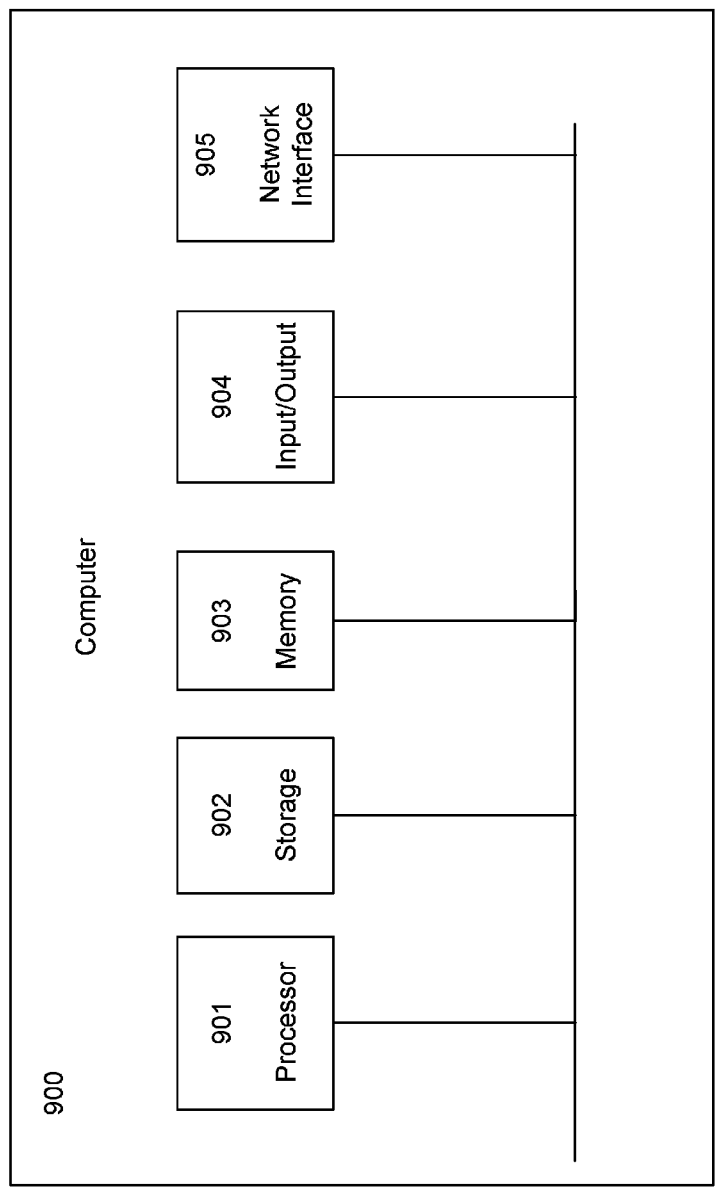
FIG. 9 shows components of a computer that may be used to implement the invention.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the method steps of FIGS. 5 and 8 can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps of FIGS. 5 and 8. Accordingly, by executing the computer program instructions, the processor 901 executes an algorithm defined by the method steps of FIGS. 5 and 8. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate lists (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including device 103, host server 101, browser 201, display 202, memory 203, database 204, processor 205, processor 302, memory 303 and application 316, may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   at a client device having one or more processors and memory storing one or more programs for execution by the one or more processors:
      detecting that an instance of a web-based messaging application has been opened;

registering the instance of the web-based messaging application with a background application running on the client device;

receiving an action pertaining to an electronic message, wherein at least some information about the electronic message is stored locally on the client device;

in accordance with a determination that the client device is in an off-line state, caching the received action pertaining to the electronic message; and responsive to a determination that the client device has transitioned from the off-line state to an on-line state at a time when the background application does not include any registered instances of the web-based messaging application, transmitting the cached action pertaining to the electronic message.

2. The method of claim 1, wherein the action is a send action and the electronic message is a draft message to be sent from the web-based messaging application to a remote recipient, wherein the electronic message is specifically addressed to the remote recipient.

3. The method of claim 1, wherein the electronic message is one of an electronic mail (email) message or an electronic chat message.

4. The method of claim 1, wherein the action is selected from the group consisting of: a send action, a delete action, a star action, a mark-as-spam action, an edit action, a move-to-folder action, a flag-as-important action, a save action, and an add attachment action.

5. The method of claim 1, further including:

after receiving the action pertaining to the electronic message, detecting that the instance of the web-based messaging application has been closed; and prior to the determination that the client device has transitioned from the off-line state to the on-line state, and in response to detecting that the instance of the web-based messaging application has been closed, de-registering the instance of the web-based messaging application with the background application.

6. The method of claim 1, wherein the background application is a background page script executing on the client device.

7. The method of claim 1, wherein:

the background application includes a counter of registered instances of the web-based messaging application;

registering the web-based messaging application increments the counter by one;

de-registering the web-based messaging application decrements the counter by one; and determining that the background application does not include any registered instances of the web-based messaging application includes determining that the counter is at zero.

8. The method of claim 1, wherein the cached electronic message is transmitted to a host server; and the method further comprises, during transmission of the action pertaining to the electronic message to the host server, locking the cached action to prevent sending a duplicate instance of the action.

9. The method of claim 8, wherein the received action pertaining to the electronic message is cached in a database, and the method further comprises:

removing the cached action pertaining to the electronic message from the database in response to receipt of an acknowledgement by the host server of successful execution of the action at the host server.

10. A non-transitory computer readable storage medium storing computer program instructions, which, when executed on a client device with a processor, cause the processor to perform operations comprising:

detecting that an instance of a web-based messaging application has been opened;

registering the instance of the web-based messaging application with a background application running on the client device;

receiving an action pertaining to an electronic message, wherein at least some information about the electronic message is stored locally on the client device;

in accordance with a determination that the client device is in an off-line state, caching the received action pertaining to the electronic message; and responsive to a determination that the client device has transitioned from the off-line state to an on-line state at a time when the background application does not include any registered instances of the web-based messaging application, transmitting the cached action pertaining to the electronic message.

11. The non-transitory computer readable storage medium of claim 10, wherein the action is a send action and the electronic message is a draft message to be sent from the web-based messaging application to a remote recipient, wherein the electronic message is specifically addressed to the remote recipient.

12. The non-transitory computer readable storage medium of claim 10, wherein the electronic message is one of an electronic mail (email) message or an electronic chat message.

13. The non-transitory computer readable storage medium of claim 10, wherein the action is selected from the group consisting of: a send action, a delete action, a star action, a mark-as-spam action, an edit action, a move-to-folder action, a flag-as-important action, a save action, and an add attachment action.

14. The non-transitory computer readable storage medium of claim 10, wherein the operations further include:

after receiving the action pertaining to the electronic message, detecting that the instance of the web-based messaging application has been closed; and prior to the determination that the client device has transitioned from the off-line state to the on-line state, and in response to detecting that the instance of the web-based messaging application has been closed, de-registering the instance of the web-based messaging application with the background application.

15. The non-transitory computer readable storage medium of claim 10, wherein the background application is a background page script executing on the client device.

16. The non-transitory computer readable storage medium of claim 10, wherein:

the background application includes a counter of registered instances of the web-based messaging application;

registering the web-based messaging application increments the counter by one;

de-registering the web-based messaging application decrements the counter by one; and determining that the background application does not include any registered instances of the web-based messaging application includes determining that the counter is at zero.

17. The non-transitory computer readable storage medium of claim 10, wherein the cached electronic message is transmitted to a host server; and the operations further include, during transmission of the action pertaining to the electronic message to the host server, locking the cached action to prevent sending a duplicate instance of the action.

18. The non-transitory computer readable storage medium of claim 17, wherein the received action pertaining to the electronic message is cached in a database, and the operations further include:

removing the cached action pertaining to the electronic message from the database in response to receipt of an acknowledgement by the host server of successful execution of the action at the host server.

19. A client device comprising:

a processor; and memory storing one or more computer programs, the computer program including instructions that when executed on the processor cause the processor to perform operations comprising:

detecting that an instance of a web-based messaging application has been opened;

registering the instance of the web-based messaging application with a background application running on the client device;

receiving an action pertaining to an electronic message, wherein at least some information about the electronic message is stored locally on the client device;

in accordance with a determination that the client device is in an off-line state, caching the received action pertaining to the electronic message; and responsive to a determination that the client device has transitioned from the off-line state to an on-line state at a time when the background application does not include any registered instances of the web-based messaging application, transmitting the cached action pertaining to the electronic message.

20. The client device of claim 19, wherein the action is a send action and the electronic message is a draft message to be sent from the web-based messaging application to a remote recipient, wherein the electronic message is specifically addressed to the remote recipient.

* * * * *